United States Patent [19]
Wollen

[11] 3,928,936
[45] Dec. 30, 1975

[54] FLOWER HOLDER

[76] Inventor: Dennis J. Wollen, 1116 E. Lexington Ave., Apt. C, Glendale, Calif. 91206

[22] Filed: Sept. 9, 1974

[21] Appl. No.: 504,329

[52] U.S. Cl................................. 47/41 SS; 47/55
[51] Int. Cl.².......................................... A01G 5/00
[58] Field of Search.......... 47/41, 41.11, 41.12, 55, 47/34.13

[56] References Cited
UNITED STATES PATENTS

| | | | |
|---|---|---|---|
| 2,691,849 | 10/1954 | Ehlers | 47/41.11 |
| 2,908,112 | 10/1959 | Koistinen | 47/41.11 |
| 3,150,462 | 9/1964 | Gallo | 47/55 |
| 3,177,617 | 4/1965 | Koistinen | 47/41.11 |
| 3,243,336 | 3/1966 | Auge | 47/41 X |
| 3,513,593 | 5/1970 | Beck | 47/34.13 |
| 3,733,746 | 5/1973 | Allen | 47/41 X |
| 3,760,460 | 9/1973 | Myers | 47/41 X |

Primary Examiner—Robert E. Bagwill
Attorney, Agent, or Firm—Jack C. Munro

[57] ABSTRACT

A flower holder wherein a chamber is formed within a housing and a liquid absorbent means contained within said housing, a plurality of deflectable protuberances located within said chamber and extending from the side wall of the chamber towards the center of the chamber, the stem of a flower to be inserted into said chamber and into contact with the absorbent material with the protuberances deflecting and frictionally binding into contact with the flower stem thereby holding the flower in position with respect to the housing, the housing being connected to a bendable wire in order to facilitate attachment of the flower holder to a corsage structure.

3 Claims, 5 Drawing Figures

FLOWER HOLDER

BACKGROUND OF THE INVENTION

The field of this invention relates to flowers and more particularly to a device to hold a mass of flowers together so that they can be assembled into a flower grouping, such as a corsage.

The general practice is for any flower grouping, such as a corsage, to be constructed individually. The flowers are manually arranged in a pattern and manually tied to a support backing which is usually made of wire. This is a time consuming procedure and when the flowers have wilted, the entire corsage is discarded. The corsage backing is then lost, Also lost is the creativity employed in the arranging of the corsage.

It would be desirable to design a holding device for flowers which are arranged in a pattern, which when cut flowers are put into the device, a work of art then becomes apparent. In this way, the flower holding structure can be reused again and again and uncreative persons may easily make beautiful flower arrangements.

SUMMARY OF THE INVENTION

The description of the structure of this invention is believed to be adequately described in the Abstract of The Disclosure and reference is to be had thereto.

The primary advantage of the structure of this invention is that the flower holder of this invention may be arranged in any desired arrangement, that arrangement being a particular work of art. This work of art can be saved and reused again and again. Therefore, the creativity of the art is never lost, The device of this invention cannot only be used for corsages but can be used for any type of flower arrangements, funerals, weddings, and so forth. The device of this invention is of simple construction and can be readily manufactured at low cost. The flower arrangement patterns can be made by a person naturally skilled in making flower arrangements and then the flowers inserted into the pattern by persons not so endowed with the ability to beautifully arrange flowers.

DETAILED DESCRIPTION OF THE SHOWN EMBODIMENT

Figure 1:
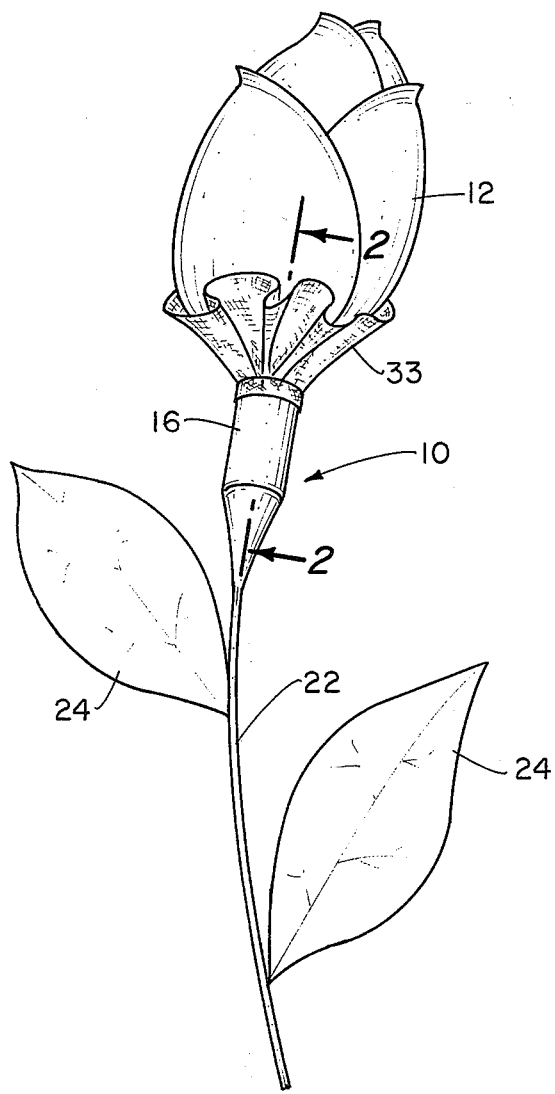
FIG. 1 is a side view of the structure of this invention showing its connection with a flower.

Referring particularly to the drawing, there is shown in FIG. 1 the flower holder 10 of this invention which is depicted holding a flower 12, such as a rose. The stem 14 of the rose 12 has been cut to be approximately five-eights of an inch to one inch in length. It is to be understood that the holder 10 of this invention can be employed with any type of flower, it only being shown with the rose type of flower.

The holder 10 is composed of a housing 16 which can be formed of a rigid synthetic material, such as a plastic. The housing 16 includes an opening 18 therein which provides access into an interior chamber 20. Attached to the bottom of the housing 16 (opposite the access opening 18) is a metal wire 22. The wire 22 is embedded within the lower section of the housing 16 and is secured in respect thereto. The wire 22 extends a substantial distance from the housing 16 and is adapted to be covered with some type of decoration simulating the stem of a plant. Attached to the wire rod 22 can be leaves 24 or other appropriate foliage, if desired.

Located within the interior chamber 20, adjacent the closed end thereof, is a pad of absorbent material 26. The absorbent material 26 is adapted to retain a quantity of water. The absorbent material 26 will normally be in the form of a sponge, however, it is considered to be within the scope of this invention to use other types of absorbent material such as wads of cotton and so forth.

Figure 2:
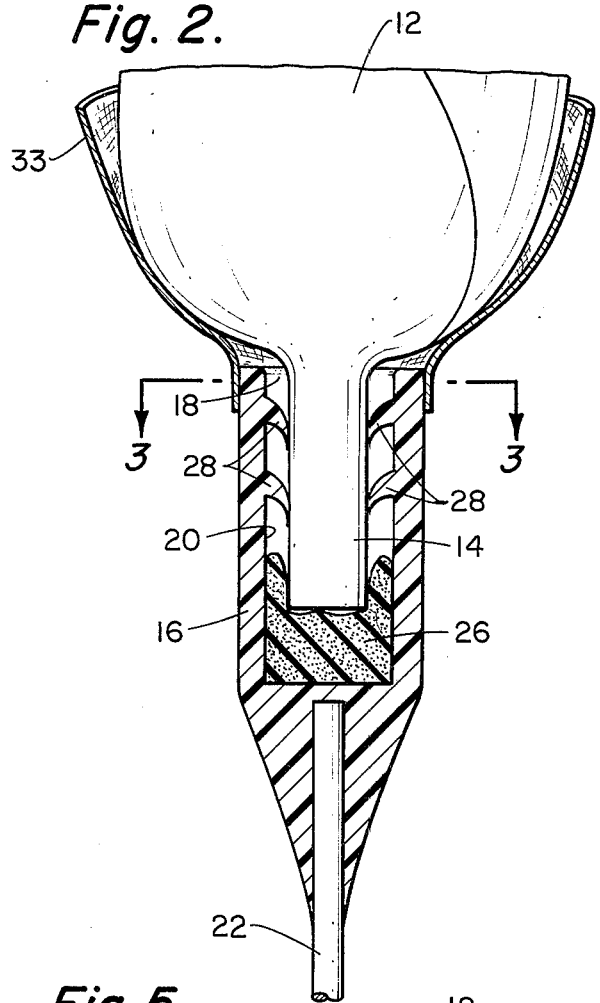
FIG. 2 is a cross-sectional view taken along line 2—2 of FIG. 1.
Figure 3:
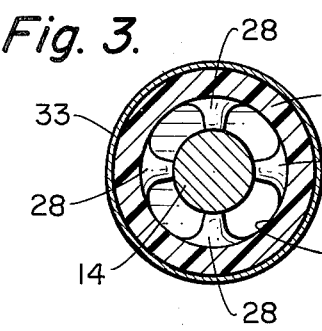
FIG. 3 is a cross-sectional view taken along line 3—3 of FIG. 2.
Figure 4:
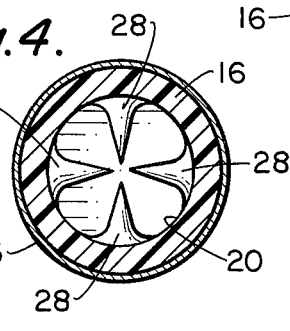
FIG. 4 is a cross-sectional view similar to FIG. 3 but showing the device not in cooperation with the flower.

Referring in particular to the structure shown in FIGS. 2 to 4, integrally formed with the housing 16 and located within the interior chamber 20 are a plurality of protuberances 28. The protuberances 28 will also be of a plastic material. There is shown two rows of four protuberances each with each protuberance within each row being equiangularly spaced apart. The protuberances have a pointed outer end. The protuberances extend substantially radially toward the center of the interior chamber 20. The protuberances are designed to be deflectable and when the stem 14 of the flower is inserted within the interior chamber 20, the protuberances deflect, as shown in FIG. 2, and frictionally bind against the stem 14. In this manner, the flower 12 is securely retained within the interior chamber and the protuberances 28 prevent the flower 12 from becoming accidentally detached from the holder 10.

The protuberances 28 are selected so as to cause the holder 12 become useable with different size of stems 14. The stem 14 of the flower 12, when inserted into the interior chamber 12, is inserted until the stem 14 is depressed within the absorbent material 26. The water contained within the absorbent material 26 can then pass into the stem 14 and into the flower 12 and helps to keep the flower 12 as fresh as possible.

Figure 5:
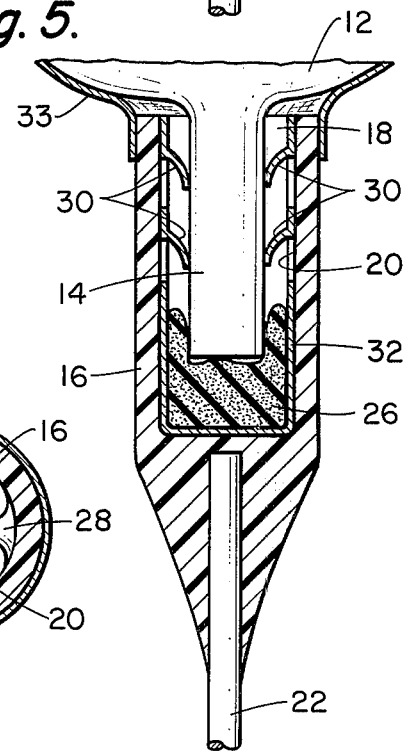
FIG. 5 is a cross-sectional view similar to FIG. 2 of a modified form of the structure of this invention.

Referring particularly to FIG. 5, a similar structure is shown and like numerals have been employed to refer to like parts. The structure of FIG. 5 is different in that instead of the protuberances being formed integral with the housing 16, the protuberances 30 are formed of metal and are attached to a sleeve 32. The sleeve 32 matingly fits within the interior chamber 20. The protuberances 30 function in the same way and deflect when the stem 14 of the flower is inserted within the chamber 20.

Normally, it is desirable to include some type of netting 33 about the upper end of the housing 16. This netting is for ornamentation purposes and is adapted to surround the base of the bud of the flower 12. This netting will normally comprise a plastic material and is to normally resemble a type of foliage.

Normally, a plurality of flower holders 10 will be arranged in a pattern or in an arrangement, such as a corsage, a wreath, and so forth. The placement of the holders 10 are fixed in place by bending of the wire 22 within some type of base (not shown). When the flower holders 10 have been arranged in a particular pattern, a flower bud 12 is placed within each given holder. The end result will be a beautiful flower arrangement.

When the flowers 12 within the arrangement have become wilted, the flowers 12 can be removed and the arrangement used again by placing new flower buds 12 therein. At the time of placing the new flower buds 12, it would be considered normal to place additional liquid within the absorbent material 26.

What is claimed is:

1. A flower holder comprising:

a housing having an internal chamber therein, an opening in said housing providing access into said chamber, said chamber having a closed bottom and a side wall and an open top;

absorbent means contained within said chamber at said closed bottom, said absorbent means adapted to contain a liquid; and retaining means attached to the wall of said chamber and located between said opening and said closed bottom, said retaining means comprising a plurality of protuberances extending inwardly toward the center of said chamber, each of said protuberances being sharp pointed, there being at least two longitudinally spaced apart rows of said protuberances with there being a plurality of protuberances for each said row, said protuberances in each said row being evenly spaced apart, the area of said protuberances for a single row being approximately one-half the cross-sectional area of said chamber, said protuberances being slightly deflectible, whereby as the stem of a flower is inserted into said chamber said protuberances deflect and bind into the flower stem thereby providing holding force for the flower stem with the stem contacting said absorbent means.

2. The flower holder as defined in claim 1 wherein: said protuberances being integral with said chamber wall.

3. The flower holder as defined in claim 1 wherein: said protuberances being attached to a sleeve, said removable sleeve defining said chamber.

* * * * *